No. 732,208. PATENTED JUNE 30, 1903.
G. D. MITCHELL.
APPARATUS FOR PURIFYING LIQUIDS.
APPLICATION FILED MAY 31, 1901.
NO MODEL. 2 SHEETS—SHEET 1.
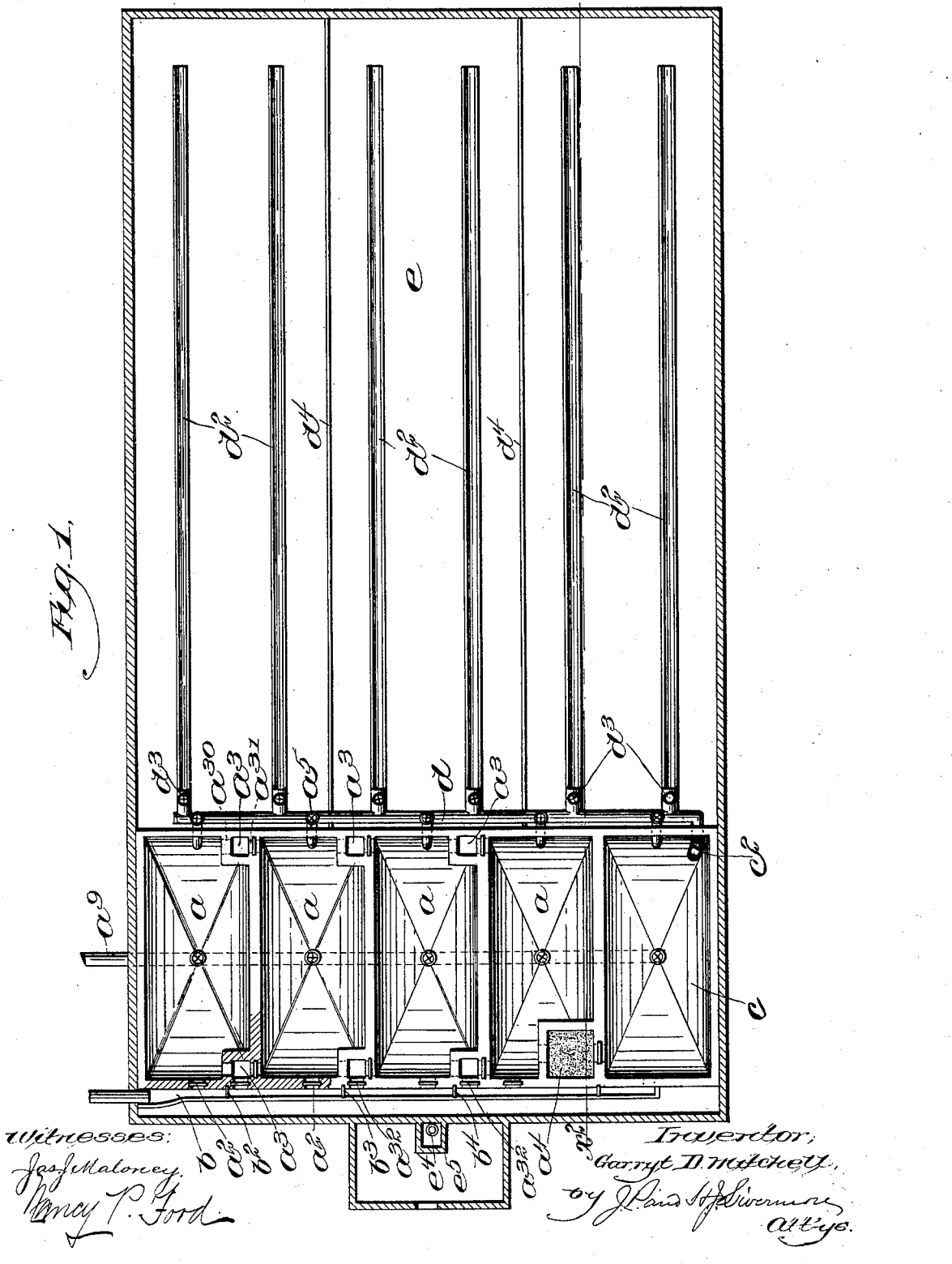

No. 732,208. PATENTED JUNE 30, 1903.
G. D. MITCHELL.
APPARATUS FOR PURIFYING LIQUIDS.
APPLICATION FILED MAY 31, 1901.
NO MODEL. 2 SHEETS—SHEET 2.
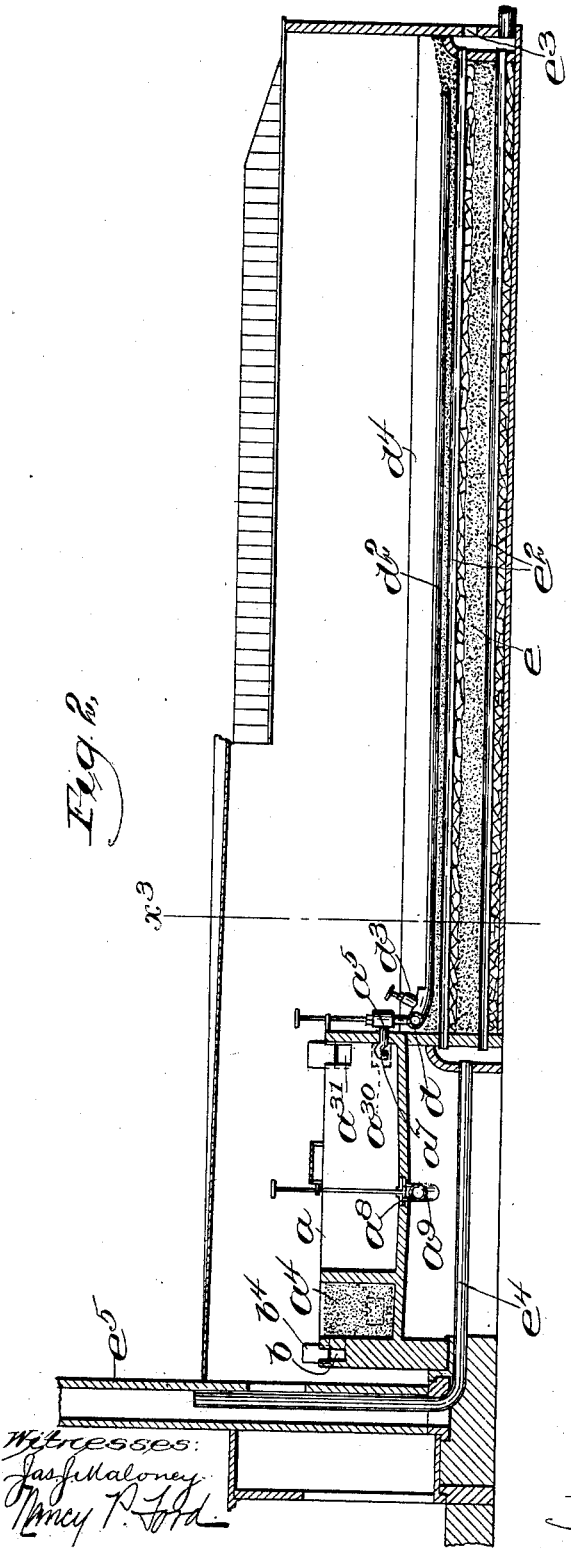
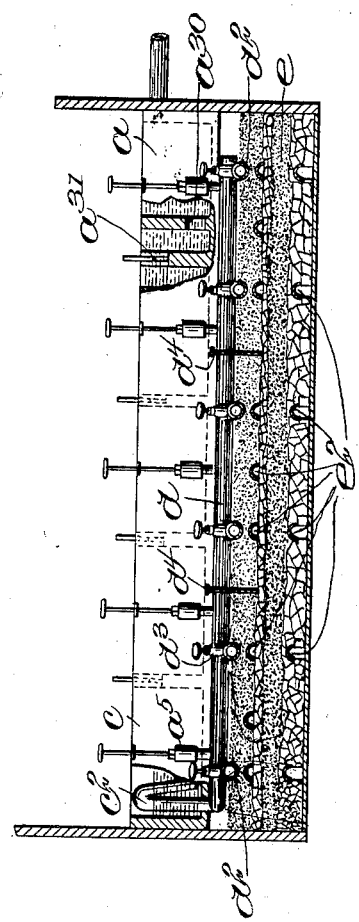

No. 732,208.

Patented June 30, 1903.

UNITED STATES PATENT OFFICE.

GARRYT D. MITCHELL, OF CHELSEA, MASSACHUSETTS.

APPARATUS FOR PURIFYING LIQUIDS.

SPECIFICATION forming part of Letters Patent No. 732,208, dated June 30, 1903.

Application filed May 31, 1901. Serial No. 62,510. (No model.)

*To all whom it may concern:*

Be it known that I, GARRYT D. MITCHELL, of Chelsea, county of Suffolk, and State of Massachusetts, have invented an Improvement in Apparatus for Purifying Liquids, of which the following description, in connection with the accompanying drawings, is a specification, like letters on the drawings representing like parts.

The present invention relates to a filtration system, and is mainly intended for use in the filtration of water supplied to cities and towns for drinking purposes, although the same system may be used for the purification of sewage, if desired, in order that the water from the sewage may be discharged into streams without polluting the water therein.

The system may be generally described as consisting of means for subjecting the water or sewage, first, to a process of sedimentation to separate the water from the heavier and lighter impurities which seek their natural levels, and, secondly, to a system of filtration in which the water or sewage which has been mainly separated from impurities which are not in actual solution is subjected to bacterial action to get rid of poisonous matter which is held in solution.

The present invention does not relate, broadly, to the system above described, which is not new, but is embodied in certain details of construction and arrangement of the plant which increases the efficiency thereof and lessens the waste, the invention, as stated, being mainly intended to be applied to the filtration of water for drinking purposes.

The system in which the invention is embodied comprises a series of tanks for the purification of the water by sedimentation, the water flowing from one tank to the next at a point intermediate between the floating impurities and those which sink to the bottom and finally passing through a suitable filter (which is preferably a body of coke and intended to take up such solid matter as may remain in the water) into a flushing-tank, which is so arranged as to be rapidly flushed or discharged at intervals, the entire contents of the said tank being thus discharged at once and distributed over a large area of filter-beds, this giving a better result than is obtained by a continual slow discharge. The flushing is controlled by a siphon or other automatic flushing device, which opens communication between the flushing-tank and a pipe or duct from which lead a series of troughs extending over the several sections of the filter-bed, so that the water from the tank is all discharged at once and distributed over substantially the entire surface of the filter-bed, so that the whole of the same is utilized at one time. The filter-bed is arranged in accordance with the invention with a series of aerating-passages near the bottom and at points intermediate between the bottom and the top and is placed under cover, the roof over the same, however, being transparent, so that the filter-bed is exposed to the sun's rays, like a hot-bed, whereby the bacterial action is aided, while the aerating pipes or tubes, through which air is preferably drawn by forced draft, supply sufficient oxygen to complete the action. The several sedimentation-tanks are arranged so that any one can be cut off from the series temporarily for cleaning purposes, and a further feature of the invention consists in providing each tank with means for drawing off the purer water therein and discharging the same over the filter-bed in order to avoid the waste of a large amount of substantially pure water when the tank is to be cleaned.

Figure 1 is a general plan view of the system embodying the invention, the walls of the inclosing building being shown in section. Fig. 2 is a transverse section on the line $x^2$ of Fig. 1, and Fig. 3 is a section transverse to the plane of Fig. 2 on line $x^3$ of said Fig. 2.

As herein shown, the apparatus is provided with a series of sedimentation-tanks $a$, to any of which the water to be purified is admitted from a sluiceway $b$ through a gate $a^2$, and the contents of the tank pass through a passage $a^3$ near the opposite end into the next tank in use, each tank being shown as having two of such passages $a^3$, one at each end, the ones opened being always diagonally opposite to each other, so as to produce a flow of water across each tank. The passages are shown as vertical, with an inlet $a^{30}$ near the bottom and an outlet $a^{31}$ near the top, so that the water leaves each tank at a point below its level, but enters each tank near the top. The inlet $a^{30}$, however, is somewhat above the level of the bottom of the tank, so that the heavier substances, which fall to the bottom, are "trapped," so to speak, while the lighter substances, which rise to the top, are suspended above the said inlet, the purer water only passing into the next tank. The last tank of the series is shown as provided with a larger passage containing filtering material $a^4$, such as coke, through which the water passes when flowing into the flushing-tank $c$, where it remains until it has reached any desired level, (preferably such level as to be substantially the entire capacity of the tank,) and after it has reached such level it is rapidly discharged in any suitable way, the discharge being shown as automatically controlled through the agency of a siphon $c^2$. The said siphon connects with a pipe or sluiceway $d$, from which extend a series of troughs $d^2$, each over the surface of the filter-bed $e$, each trough being controlled by a gate or valve $d^3$. The filter-bed is built up in the usual way of broken stone, gravel, and sand and is shown as divided by partitions $d^4$ into several sections, it being practicable to control the discharge of water by the valves $d^3$, so that any section can be allowed to rest for cleaning and purification. Extending through the body of the filter-bed at two or more levels are aerating-passages $e^2$, shown as inverted-trough-shaped ducts supported in the material of which the filter-bed is built up, and these ducts are supplied with fresh air through an inlet $e^3$, the air being drawn through the ducts into an outlet-pipe $e^4$, which passes into the chimney $e^5$, which may be provided with a fan or blower, if necessary, to produce a forced draft, or may constitute the draft-passage for a furnace, which purifies and deodorizes the air as it passes up the chimney. The said ducts are laterally open to the filtering material, being shown as supported upon the larger pieces of rock, so that the impure gases can enter the ducts and mingle with the air flowing through the same, the result being that the gases are sucked up by the air and carried away. The lateral opening, moreover, is shown as underneath, so that the water trickling down is shed by the ducts, while the air travels through the ducts over the water below, carrying away the rising gases.

The filter-beds are arranged under a glass roof and are inclosed in the building, the heat of the sun heightening the bacterial action, while the flow of air through the aerating-passages affords a continual supply of fresh oxygen.

The tanks $a$ are so arranged that any one of them can be cut out for cleaning purposes without interfering with the action of the others, so that the plant can remain in continual operation without being shut down for the purpose of cleaning the tanks or resting the filter-bed. The sluiceway $b$ for this purpose has an outlet $a^3$, leading to each of the tanks, each outlet being supplied with a gate or valve, so that if any tank is shut off from the rest by closing the communicating passage $a^3$ the water can flow around the said tank through the sluiceway and into the next tank of the series. The said sluiceway is also provided with gates or valves $b^2$ $b^3$ $b^4$ to control the flow of water, and each passage $a^3$ has a gate $a^{32}$, controlling an opening into the sluiceway, so that by manipulating the valves the water can pass through the sluiceway around any tank.

In order to avoid wasting the large amount of comparatively pure water in any tank which is to be cut out and emptied for cleaning purposes, each tank is provided in accordance with the invention with an outlet $a^5$, which opens directly into the discharge-pipe $d$, with an inverted trap $a^7$, the inlet to which is far enough above the bottom of the tank to leave all the sediment in the said tank, while the bend of the trap is sufficiently high to cut off all floating matter, the result being that the purer water in the tank is discharged directly onto the filter-bed, and thereby saved. To facilitate the cleaning of the tanks, each tank is shown as provided with a sloping bottom and an outlet $a^8$ at the middle, the said outlet opening into a discharge-pipe $a^9$, toward which the impurities may be directed by those cleaning the tank. The outlet-pipe $a^9$ is also shown as communicating with the flushing-tank $c$, so that if clean water is wanted in the tank which is being cleaned it can be obtained by opening the valve in the flushing-tank and that of the tank being cleaned, so that the water from the flushing-tank in any desired quantity will back up into the tank which is empty.

I claim—

1. In a filtration system the combination with a series of sedimentation-tanks each having an opening into the next tank below the normal water-level; of a flushing-tank adapted to receive water from the sedimentation-tanks; means for rapidly discharging the water from said flushing-tank at intervals, and a filter-bed to receive the water from the said flushing-tank, as set forth.

2. In a filtration system the combination with a series of sedimentation-tanks each having an opening into the next tank below the normal water-level; of a flushing-tank adapted to receive water from the sedimentation-tanks; a filter interposed between the sedimentation-tanks and the flushing-tank and a filter-bed to receive the water from the said flushing-tank.

3. In a filtration system, the combination with a series of sedimentation-tanks each having an opening into the next tank below the normal water-level; of a flushing-tank adapted to receive water from the sedimentation-tanks; means for rapidly discharging the water from said flushing-tank at intervals; a filter-bed; and discharging pipes or troughs to distribute the water from the flushing-tank over the surface of said filter-bed, as set forth.

4. In a filtration system the combination with a series of sedimentation-tanks each having an opening into the next tank below the normal water-level; of a flushing-tank adapted to receive water from the sedimentation-tanks; means for rapidly discharging the water from said flushing-tank at intervals; a filter-bed divided by partitions into separate sections; a distributing-pipe to receive water from the flushing-tank; and troughs leading from said pipe over different portions of the filter-bed, the said troughs being each provided with means for shutting off the water therefrom so that part only of the filter-bed may be used at a time.

5. In a filtration system, the combination with a series of sedimentation-tanks; of a filter to receive the water which has been partially purified in said tanks; passages extending through the body of said filter at different levels below the surface thereof, said passages being laterally open underneath to the filtering material; and means for circulating air through said passages to carry away the gases, substantially as described.

6. In a filtration system the combination with a series of sedimentation-tanks provided with passages through which the water flows from one tank to another; of means for cutting out any tank of a series and passing the water around the same through a duct or passage to the tank beyond; a filter-bed; and an outlet from each tank directly to the filter-bed, the said outlet being near the bottom of the tank and controlled by a valve, as set forth.

7. In a filtration system the combination with a series of sedimentation-tanks provided with passages through which the water flows from one tank to another; of means for cutting out any tank of a series and passing the water around the same through a duct or passage to the tank beyond; a filter-bed; an outlet from each tank directly to the filter-bed, the said outlet being near the bottom of the tank and controlled by a valve; and an inverted trap for each of said outlets, as set forth.

In testimony whereof I have signed my name to this specification in the presence of two subscribing witnesses.

GARRYT D. MITCHELL.

Witnesses:
HENRY J. LIVERMORE,
JAS. J. MALONEY.